United States Patent
Newberg et al.

(10) Patent No.: US 12,352,770 B2
(45) Date of Patent: Jul. 8, 2025

(54) POWER OFF DELAY SYSTEM AND METHOD

(71) Applicant: Leica Biosystems Imaging, Inc., Vista, CA (US)

(72) Inventors: Nicholas Newberg, San Marcos, CA (US); Benjamin Siehl, Nussloc (DE); Markus Wittmann, Heidelberg (DE); Markus Sharpe, Heidelberg (DE)

(73) Assignee: Leica Biosystems Imaging, Inc., Vista, CA (US)

( * ) Notice: Subject to any disclaimer, the term of this patent is extended or adjusted under 35 U.S.C. 154(b) by 0 days.

(21) Appl. No.: 18/103,716

(22) Filed: Jan. 31, 2023

(65) Prior Publication Data

US 2023/0176082 A1    Jun. 8, 2023

Related U.S. Application Data

(62) Division of application No. 17/813,877, filed on Jul. 20, 2022, now Pat. No. 11,604,200, which is a
(Continued)

(51) Int. Cl.
*G01N 35/00*  (2006.01)
*G01N 35/04*  (2006.01)
(Continued)

(52) U.S. Cl.
CPC .  *G01N 35/00584* (2013.01); *G01N 35/00029* (2013.01); *G01N 35/04* (2013.01); *G02B 21/26* (2013.01); *G02B 21/34* (2013.01); *H02J 9/06* (2013.01); *G01N 2035/00138* (2013.01); *G01N 2035/0475* (2013.01)

(58) Field of Classification Search
CPC ....... G01N 35/00584; G01N 35/00029; G01N 35/04; G01N 2035/00138; G01N 2035/0475; G02B 21/26; G02B 21/34; H02J 9/06
See application file for complete search history.

(56) References Cited

U.S. PATENT DOCUMENTS

| | | | |
|---|---|---|---|
| 2005/0090017 A1* | 4/2005 | Morales | G01N 1/30 422/536 |
| 2006/0178776 A1* | 8/2006 | Feingold | G01N 35/0092 700/245 |

(Continued)

*Primary Examiner* — Elizabeth A Robinson
*Assistant Examiner* — Tingchen Shi
(74) *Attorney, Agent, or Firm* — Frost Brown Todd LLP (57) ABSTRACT

A power off delay system and method is configured to delay termination of electrical power to a digital pathology device in a power off condition. If the apparatus includes a UPS, the power off delay system and method delays termination of electrical power when a power switch is turned off and when a catastrophic power failure occurs. During the delay of the termination of electrical power, the digital pathology device is configured to control the scanning stage system and the glass slide conveyor system and the slide rack conveyor system to place each of these systems into a known state and position all glass slides into a known position prior to the termination of electrical power to the digital pathology device. This allows the digital pathology device to resume normal operation upon power up.

13 Claims, 4 Drawing Sheets

Related U.S. Application Data division of application No. 16/624,724, filed as application No. PCT/US2019/020411 on Mar. 1, 2019, now Pat. No. 11,415,585.

(60) Provisional application No. 62/637,299, filed on Mar. 1, 2018.

(51) Int. Cl.
*G02B 21/26* (2006.01)
*G02B 21/34* (2006.01)
*H02J 9/06* (2006.01)

(56) References Cited

U.S. PATENT DOCUMENTS

2010/0055663 A1* 3/2010 Konrad ............ G01N 35/00623
 435/283.1
2014/0295562 A1* 10/2014 Wakamiya ............. G01N 35/04
 422/67

* cited by examiner

POWER OFF DELAY SYSTEM AND METHOD

CROSS-REFERENCE TO RELATED APPLICATIONS

This application is a divisional of U.S. Ser. No. 17/813,877, entitled "Power Off Delay System and Method," filed on Jul. 20, 2022, which is a divisional of U.S. Ser. No. 16/624,724, entitled "Power Off Delay System and Method," filed on Dec. 19, 2019, which is a National Stage Entry of PCT/US2019/020411, entitled "Power Off Delay System and Method," filed on Mar. 1, 2019, which claims priority to U.S. Provisional Patent Application No. 62/637,299, filed on Mar. 1, 2018, which are hereby incorporated herein by reference as if set forth in full.

BACKGROUND

Field of the Invention

The present invention generally relates to pathology sample processing devices and more particularly relates to safely shutting down the pathology sample processing device in response to a power off even or a power failure event.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology exploded and is currently regarded as one of the most promising avenues of diagnostic medicine in order to achieve even better, faster and cheaper diagnosis, prognosis and prediction of cancer and other important diseases.

In a conventional pathology sample processing device, a power off condition caused by pressing the power switch or by a catastrophic power failure results in the pathology sample processing device having an unknown state when the power is restored to the system. This unknown state requires user intervention and manual repositioning of pathology samples and/or glass slides, for example repositioning a glass slide from the scanning stage back into the slide rack in order to return the pathology sample processing device to a known state so that normal operation can resume upon the return of the flow of electrical power.

In some conventional pathology sample processing devices, an uninterruptible power supply ("UPS") is added that allows the system to continue normal operation during a catastrophic power failure. However, if the power failure persists and the UPS itself runs out of power, the pathology sample processing device experiences a delayed catastrophic power failure. Therefore, what is needed is a system and method that overcomes these significant problems found in the conventional systems as described above.

SUMMARY

Accordingly, described herein is a power off delay system and method that solves the problems described above by allowing a pathology sample processing device to delay termination of electrical power to the pathology sample processing device in a power off condition. During the delay, the pathology sample processing device is configured to control the systems and sub-systems of the pathology sample processing device to place each of these systems and sub-systems into a known state and position all pathology samples and/or glass slides into a known position prior to the termination of electrical power to the pathology sample processing device. This allows the pathology sample processing device to resume normal operation without manual intervention when the flow of electrical power is returned. The controlled power off condition also allows the system to protect glass slides and/or the samples that are being processed by the pathology sample processing device to prevent damage to the glass slides and/or the samples.

Similarly, some pathology sample processing devices are configured to suspend movement of all moving parts when a protective housing of the pathology sample processing device is opened. These pathology sample processing devices are controlled by the power off delay system to place each of the systems and/or sub-systems into a known state and position all pathology samples and/or glass slides into a known position prior to the suspension of movement of the moving parts and in response to detecting that the protective housing has been opened.

In an embodiment, a digital pathology device comprises a stage upon which a glass slide is positioned during scanning, a slide conveyor system configured to move glass slides between a position in the slide rack and a position on the stage, a power switch configured to control the flow of electrical power between an external power source and the digital pathology device, and a processor configured to detect a signal from the power switch indicating that the flow of electrical power from the external power source to the digital pathology device is to be switched off. In response to detecting the signal from the power switch indicating that the flow of electrical power from the external power source to the digital pathology device is to be switched off (or otherwise interrupted), the processor is further configured to control the stage and the slide rack and the slide conveyor system to position all glass slides in the slide rack prior to termination of the flow of electrical power from the external power source to the digital pathology device.

In an embodiment, a digital pathology device comprises a stage upon which a glass slide is positioned during scanning, a slide conveyor system configured to move glass slides between a position in the slide rack and a position on the stage, an uninterruptible power supply configured to supply power to the digital scanning device in the event of a power failure comprising a termination of the flow of electrical power from an external power source to the digital pathology device, and a processor configured to detect a signal from the uninterruptible power supply indicating that the flow of electrical power from the external power source to the digital pathology device has been terminated. In response to detecting the signal from the uninterruptible power supply indicating that the flow of electrical power from the external power source to the digital pathology device has been terminated (or otherwise interrupted), the processor is further configured to control the stage and the slide rack and the slide conveyor system to position all glass slides in the slide rack prior to termination of the flow of electrical power from the uninterruptible power supply to the digital pathology device.

In an embodiment, a digital pathology device comprises a plurality of moving parts including a stage upon which a glass slide is positioned during scanning and a slide conveyor system configured to move glass slides between a position in the slide rack and a position on the stage, a housing having an open position and a closed position, the housing configured to surround the plurality of moving parts on at least a plurality of sides in the closed position, a sensor system configured to detect a transition of the housing from the closed position to the open position, and a processor configured to control movement of the plurality of moving parts. The processor is configured to receive a signal from the sensor system and determine based upon the signal that the housing has transitioned from the closed position to the open position, and subsequent to determining that the housing has transitioned from the closed position to the open position, the processor is further configured to control the stage and the slide rack and the slide conveyor system to position all glass slides in the slide rack and subsequent to positioning all glass slides in the slide rack, to prevent movement of the plurality of moving parts.

In an embodiment, a method for delaying a power-off condition in a digital pathology device comprises detecting a signal from a power switch configured to control the flow of electrical power between an external power source and the digital pathology device, determining based on the signal from the power switch that the flow of electrical power from an external power source to a digital pathology device is to be terminated, and delaying termination of the flow of electrical power from the external power source to a digital pathology device for a predetermined delay period. The method further includes, during the delay period, controlling the stage and the slide rack and the slide conveyor system to position all glass slides in the slide rack prior to termination of the flow of electrical power from the external power source to the digital pathology device.

In an embodiment, a method for delaying a power-off condition in a digital pathology device having an uninterruptible power supply comprises detecting a signal from the uninterruptible power supply, and determining based on the signal from the uninterruptible power supply that the flow of electrical power from the external power source to a digital pathology device has been terminated (or otherwise interrupted). The method further includes, subsequent to determining that during the flow of electrical power from the external power source to a digital pathology device has been terminated, controlling the stage and the slide rack and the slide conveyor system to position all glass slides in the slide rack prior to termination of the flow of electrical power from the uninterruptible power supply to the digital pathology device.

In an embodiment, a method for delaying a power-off condition in a digital pathology device comprises receiving a signal from a sensor system and determining based upon the signal that the housing has transitioned from the closed position to the open position. The method further includes, subsequent to determining that the housing has transitioned from the closed position to the open position, controlling the stage and the slide rack and the slide conveyor system to position all glass slides in the slide rack. The method further includes, subsequent to positioning all glass slides in the slide rack, controlling the plurality of moving parts to prevent movement of the plurality of moving parts.

In an embodiment, a pathology sample processing device comprises a pathology sample processing system configured to process a pathology sample, a conveyor system configured to move a pathology sample from a first position to a second position, a power switch configured to control the flow of electrical power between an external power source and the pathology sample processing device, and a processor configured to detect a signal from the power switch indicating that the flow of electrical power from the external power source to the pathology sample processing device is to be switched off. In response to detecting the signal from the power switch indicating that the flow of electrical power from the external power source to the pathology sample processing device is to be switched off, the processor is further configured to control the pathology sample processing system and the conveyor system to position all pathology samples in a known position prior to termination of the flow of electrical power from the external power source to the pathology sample processing device.

In an embodiment, a pathology sample processing device comprises a pathology sample processing system configured to process a pathology sample, a conveyor system configured to move a pathology sample from a first position to a second position, an uninterruptible power supply configured to supply power to the pathology sample processing device in the event of a power failure comprising a termination of the flow of electrical power from an external power source to the pathology sample processing device, and a processor configured to detect a signal from the uninterruptible power supply indicating that the flow of electrical power from the external power source to the pathology sample processing device has been terminated. In response to detecting the signal from the uninterruptible power supply indicating that the flow of electrical power from the external power source to the pathology sample processing device has been terminated, the processor is further configured to control the pathology sample processing system and the conveyor system to position all pathology samples in a known position prior to termination of the flow of electrical power from the uninterruptible power supply to the pathology sample processing device.

In an embodiment, a pathology sample processing device comprises a plurality of moving parts including a pathology sample processing system configured to process a pathology sample and a conveyor system configured to move a pathology sample from a first position to a second position, a housing having an open position and a closed position, the housing configured to surround the plurality of moving parts on at least a plurality of sides in the closed position, a sensor system configured to detect a transition of the housing from the closed position to the open position, and a processor configured to control movement of the plurality of moving parts. In this embodiment, the processor is also configured to receive a signal from the sensor system and determine based upon the signal that the housing has transitioned from the closed position to the open position. Subsequent to determining that the housing has transitioned from the closed position to the open position, the processor is further configured to control the pathology sample processing system and the conveyor system to position all pathology samples in a known position and subsequently prevent movement of the plurality of moving parts during a time period in which the housing is in the open position.

In an embodiment, a method for delaying a power-off condition in a pathology sample processing device having a pathology sample processing system configured to process a pathology sample and a conveyor system configured to move the pathology sample from a first position to a second position comprises detecting a signal from a power switch configured to control the flow of electrical power between an external power source and the pathology sample processing device, determining based on the signal from the power switch that the flow of electrical power from an external power source to the pathology sample processing device is to be terminated, and delaying termination of the flow of electrical power from the external power source to the pathology sample processing device for a predetermined delay period. The method also includes, during the delay period, controlling the pathology sample processing system and the conveyor system to position all pathology samples in a known position prior to termination of the flow of electrical power from the external power source to the pathology sample processing device.

In an embodiment, a method for delaying a power-off condition in a pathology sample processing device having a pathology sample processing system configured to process a pathology sample, a conveyor system configured to move the pathology sample from a first position to a second position, and an uninterruptible power supply configured to supply power to the pathology sample processing device in the event of a power failure comprising a termination of the flow of electrical power from an external power source to the pathology sample processing device comprises detecting a signal from the uninterruptible power supply and determining based on the signal from the uninterruptible power supply that the flow of electrical power from the external power source to a pathology sample processing device has been terminated. The method also includes, subsequent to determining that the flow of electrical power from the external power source to the pathology sample processing device has been terminated, controlling the pathology sample processing system and the conveyor system to position all pathology samples in a known position prior to termination of the flow of electrical power from the uninterruptible power supply to the pathology sample processing device.

In an embodiment, a method for delaying a power-off condition in a pathology sample processing device having a plurality of moving parts including a pathology sample processing system configured to process a pathology sample, a conveyor system configured to move the pathology sample from a first position to a second position, and a housing having an open position and a closed position, comprises receiving a signal from a sensor system and determining based upon the signal that the housing has transitioned from the closed position to the open position. The method also includes, subsequent to determining that the housing has transitioned from the closed position to the open position, controlling the pathology sample processing system and the conveyor system to position all pathology samples into a known position. The method also includes, subsequent to positioning all pathology samples into a known position, controlling the plurality of moving parts to prevent movement of the plurality of moving parts during a time period in which the housing is in the open position.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a power off delay system and method that delays termination of the flow of electricity to a pathology sample processing system and controls the moving parts and sub-systems of the pathology sample processing system to place each of these systems into a known state and position all pathology samples (e.g., glass slides with a sample thereon) into a known position prior to the termination of electrical power to the digital pathology device. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims. Furthermore, in this description, a pathology sample processing system may be referred to as a digital pathology device and/or a digital slide scanning device or a digital scanner or the like. As described later with respect to FIG. 5, there are a number of different devices that are involved in pathology sample processing and as used herein, a pathology sample processing system includes any and all of such devices that may be involved in the processing of a sample.

Figure 1:
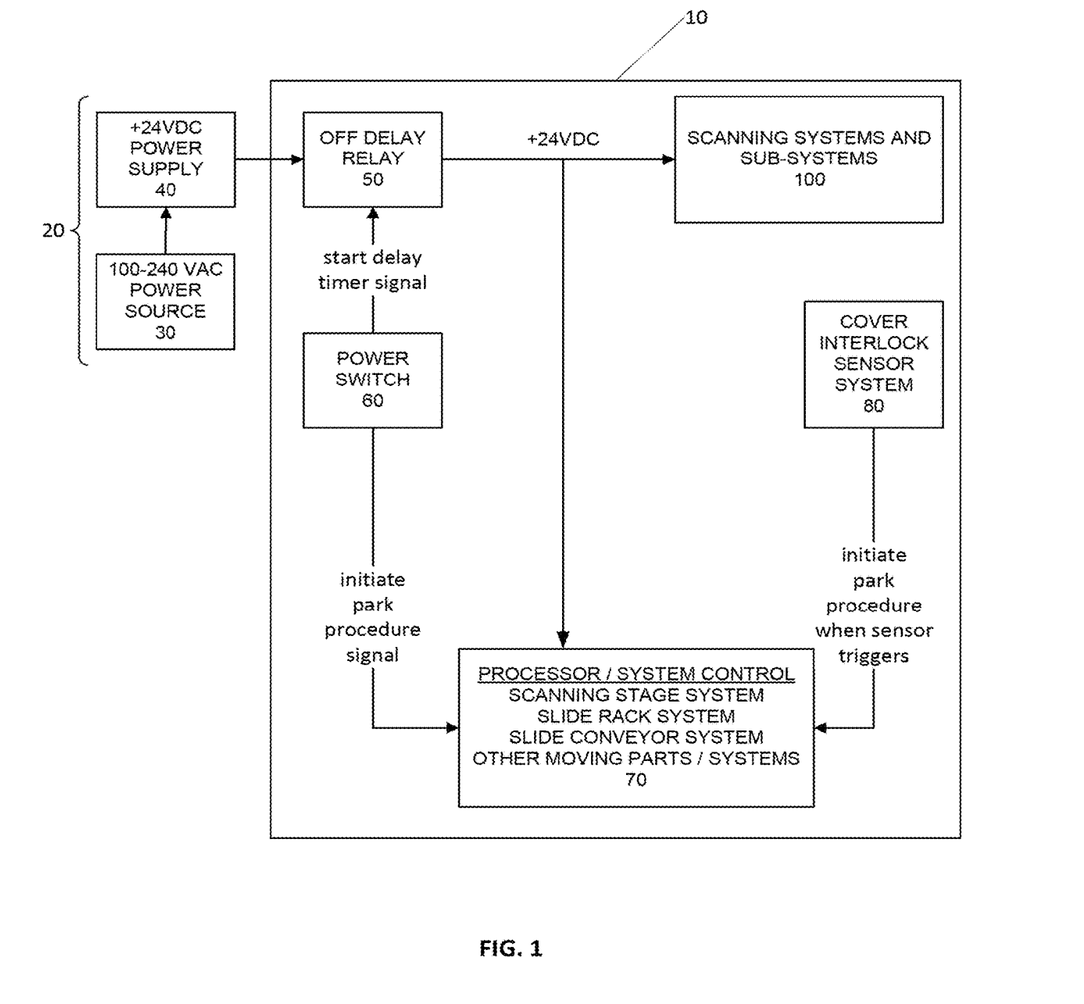
FIG. 1 is a block diagram illustrating an example digital pathology device according to an embodiment of the invention.

FIG. 1 is a block diagram illustrating an example digital pathology device 10 according to an embodiment of the invention. In the illustrated embodiment, the digital pathology device 10 is connected to an external power source 30 that supplies power to the scanning device 10 via a power supply 40. The digital pathology device 10 also includes a power switch 60 that is communicatively coupled with an off delay relay 50 that is positioned in the path 20 of the flow of electrical power from the external power source 30 to the digital pathology device 10. When the power switch 60 is manipulated into an OFF position, the power switch 60 sends a signal to the off delay relay 50 that causes the off delay relay 50 to initiate a delay timer that is implemented by the off delay relay 50. The off delay relay 50, in turn, delays the termination of power from the external power source 30 to the digital pathology device 10 for a delay period amount of time. In one embodiment, the delay period is a predetermined amount of time.

The power switch 60 is also communicatively coupled with a processor 70 that is configured to control operation of the digital pathology device 10 system and its various scanning systems and sub-systems 100 and all moving parts of the digital pathology device 10. When the power switch 60 is manipulated into an OFF position, the power switch 60 sends a signal to the processor 70 that causes the processor 70 to initiate a park procedure that controls at least the scanning stage system and the slide rack system and the slide conveyor system included in the scanning systems and sub-systems 100 to place each of these systems into a known state (i.e., a safe condition state) and to position each glass slide in a slide rack prior to termination of the flow of electrical power from the external power source 30 to the digital pathology device 10.

The digital pathology device 10 also includes a cover interlock sensor system 80 that is configured to detect when a housing of the scanning device 10 is opened. In one embodiment, the cover interlock system 80 is a magnetic sensor system that generates a signal when the housing of the scanning device 10 is closed. In this embodiment, the processor 70 is configured to detect an absence of the signal and thereby determine that the housing of the scanning device 10 has transitioned into an open position. In an alternative embodiment, the processor 70 may be configured to detect the presence of a signal and thereby determine that the housing of the scanning device 10 has transitioned into an open position. When the processor 70 determines that the housing of the scanning device 10 has transitioned into an open position, the processor 70 initiates a park procedure that controls at least the scanning stage system and the slide rack system and the slide conveyor system of the scanning systems and sub-systems 100 to place each of these systems into a known state (i.e., a safe condition state) and to position each glass slide in a slide rack. After completing the park procedure, the processor 70 also disables motion of all other moving parts/systems while the housing of the digital pathology device 10 remains in an open position.

Figure 2:
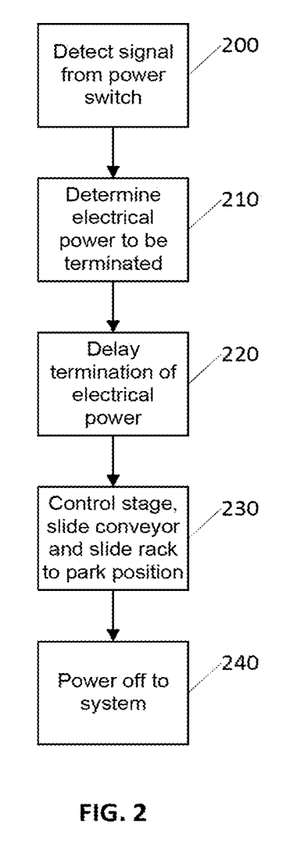
FIG. 2 is a flow diagram illustrating an example process for controlled power loss in a digital pathology device according to an embodiment of the invention.

FIG. 2 is a flow diagram illustrating an example process for controlled power loss in a digital pathology device 10 according to an embodiment of the invention. The illustrated process may be carried out by a digital pathology device 10 such as described with respect to FIGS. 1 and 5A-5D. In the illustrated embodiment, initially in step 200, the scanning device 10 detects a signal from the power switch indicating that the power switch has been manipulated. In step 210, the scanning device 10 determines, based on the signal from the power switch, that the flow of electrical power from the external power source to the scanning device 10 is to be turned off. For example, an operator of the scanning device 10 may have manipulated the power switch into an "off" position.

Next, in step 220, termination of the flow of electrical power from the external power source to the scanning device 10 is delayed. Advantageously, the delay may be implemented by an off delay relay apparatus that is electrically coupled with the electrical path for the flow of electrical power from the external power source to the scanning device 10.

Next, in step 230, a processor of the scanning device 10 initiates a park procedure that controls at least the scanning stage system and the slide rack system and the slide conveyor system of the scanning device 10 to place each of these systems into a known state (i.e., a safe condition state) and to position each glass slide in a slide rack prior to termination of the flow of electrical power from the external power source to the scanning device 10 in step 240. This advantageously places the digital pathology device 10 into a known state (i.e., a safe condition state) prior to powering off such that when power is restored to the scanning device 10, the scanning device 10 may resume normal operation without manual intervention by an operator.

Figure 3:
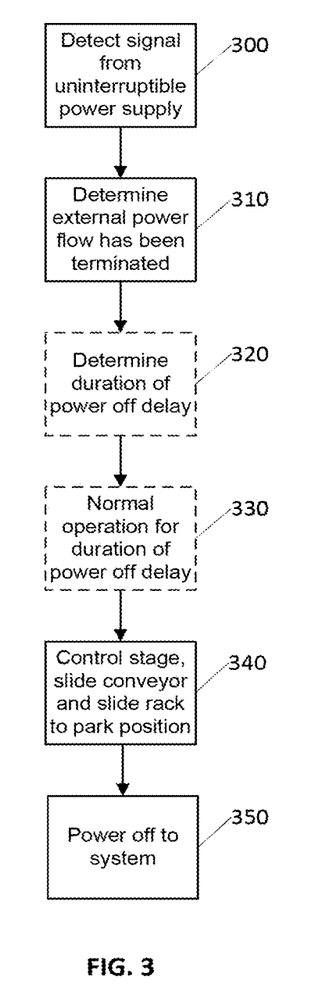
FIG. 3 is a flow diagram illustrating an example process for controlled power loss in a digital pathology device according to an embodiment of the invention.

FIG. 3 is a flow diagram illustrating an example process for controlled power loss in a digital pathology device 10 according to an embodiment of the invention. The illustrated process may be carried out by a digital pathology device 10 such as described with respect to FIGS. 1 and 5A-5D that is configured with an uninterruptible power supply. In the illustrated embodiment, initially in step 300, the scanning device 10 detects a signal from the uninterruptible power supply indicating that the flow of electrical power from the external power source has been terminated. In step 310, the scanning device 10 determines, based on the signal from the uninterruptible power supply, that the flow of electrical power from the external power source to the scanning device 10 has been terminated. The flow of electrical power may have been terminated due to a catastrophic power failure, an accidental power failure, or any other reason. For example, an operator of the scanning device 10 may have manipulated the power switch into an "off" position.

Next, in optional step 320, a processor of the scanning device 10 determines a duration of the power off delay. For example, the processor may determine that the uninterruptible power supply has a power level (i.e., has sufficient energy stored) to allow continued operation of the scanning apparatus for a specific amount of time, which corresponds to the duration of the power off delay. In one embodiment, the duration of the power off delay is determined by the processor to correspond to a time when the power level of the uninterruptible power supply reaches a predetermined threshold, for example, when 90% of the stored energy is depleted. Next, in optional step 330, the scanning device 10 continues normal operation during the duration of the power off delay. Advantageously, electrical power from the external power source may be restored during the duration of the power off delay to allow the scanning device 10 to maintain continuous operation.

Next, in step 340, a processor of the scanning device 10 initiates a park procedure that controls at least the scanning stage system and the slide rack system and the slide conveyor system of the scanning device 10 to place each of these systems into a known state (i.e., a safe condition state) and to position each glass slide in a slide rack prior to termination of the flow of electrical power from the external power source to the scanning device 10 in step 350. This advantageously places the digital pathology device 10 into a known state (i.e., a safe condition state) prior to powering off such that when power is restored to the scanning device 10, the scanning device 10 may resume normal operation without manual intervention by an operator. Advantageously, the park procedure may be implemented at any time after the processor determines in step 310 that the flow of electrical power from the external power source to the scanning device 10 has been terminated.

Figure 4:
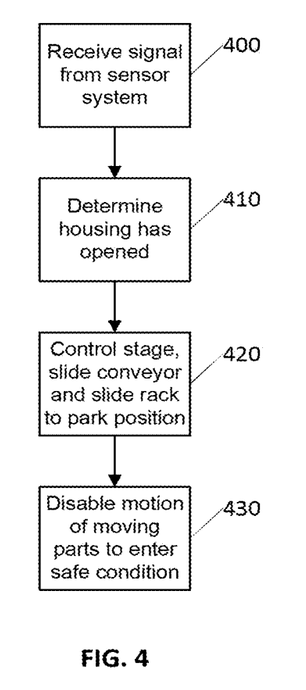
FIG. 4 is a flow diagram illustrating an example process for preventing movement of moving parts in a digital pathology device according to an embodiment of the invention.

FIG. 4 is a flow diagram illustrating an example process for preventing movement of moving parts in a digital pathology device 10 according to an embodiment of the invention. The illustrated process may be carried out by a digital pathology device 10 such as described with respect to FIGS. 1 and 5A-5D. In the illustrated embodiment, initially in step 400, the scanning device 10 receives a signal (or detects the absence of a signal) from a sensor system indicating that a housing of the scanning device 10 has transitioned from a closed position to an open position. In step 410, the scanning device 10 determines, based on the signal (or absence thereof) from the sensor system, that a housing of the scanning device 10 has transitioned from a closed position to an open position that requires for safety purposes that movement of all moving parts of the scanning device 10 be suspended. For example, an operator of the scanning device 10 may have opened the primary housing that covers the scanning device 10.

Next, in step 420, a processor of the scanning device 10 initiates a park procedure that controls at least the scanning stage system and the slide rack system and the slide conveyor system of the scanning device 10 to place each of these systems into a known state (i.e., a safe condition state) and to position each glass slide in a slide rack prior to termination of the flow of electrical power from the external power source to the scanning device 10. This advantageously places the digital pathology device 10 into a known state (i.e., a safe condition state) such that the scanning device 10 may resume normal operation without manual intervention by an operator when the housing transitions back into a closed position.

Next, in step 430, a processor of the digital pathology device 10 controls all moving parts of the scanning device 10 to disable motion of all of the moving parts of the scanning device 10 while the housing of the digital pathology device 10 remains in an open position.

Figure 5:
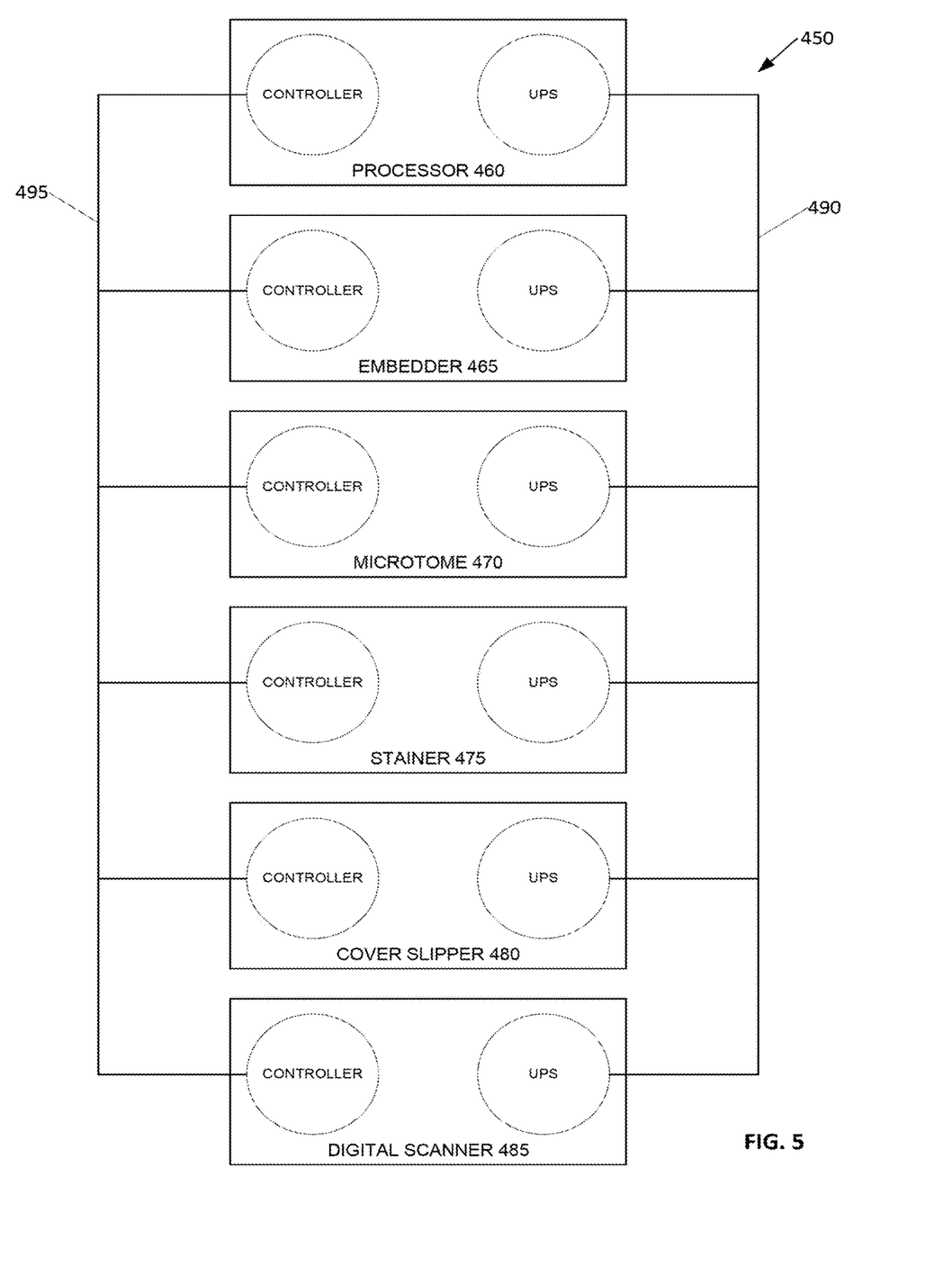
FIG. 5 is a block diagram illustrating an example system for sample processing according to an embodiment of the invention.

FIG. 5 is a block diagram illustrating an example system 450 for sample processing according to an embodiment of the invention. In the illustrated embodiment, the system 450 includes a sample processor 460, a sample embedder 465, a microtome 470, a stainer 475, a cover slipper 480 and a digital slide scanner 485. The order of the systems in FIG. 5 represents one example sequence for sample processing in the sample processing system 450. Alternative sequences may also be employed as desired.

In pathology, a large number of devices are used in the laboratory for sample preparation, beginning with a sample processor 460 in which the biological samples are fixed, dehydrated, and infiltrated with paraffin. In this process, the sample is located in a closed cassette having small openings for liquid exchange. Multiple cassettes are grouped together in containers, and processed simultaneously. One example of a sample processor 460 is depicted and described, for example, in U.S. Pat. No. 7,722,811 B2 (processor), which is incorporated herein by reference in its entirety. Processing takes place here in a retort into which various chemicals are pumped. Embedding of the sample into a paraffin block is then accomplished using a further device such as embedder 465. One example of an automatically operating device is depicted and described in U.S. Pat. No. 9,671,322 (embedder), which is incorporated herein by reference in its entirety. This paraffin block having the sample is sectioned into thin slices with a microtome 470, and the sectioned samples are mounted onto a specimen slide. One example of a microtome 470 is depicted and described in U.S. Pat. No. 7,273,000 B2 (microtome), which is incorporated herein by reference in its entirety. The paraffin block having the sample is clamped into the specimen holder that, driven by the handwheel, executes an up-and-down motion and thereby guides the sample over the knife. Thin sections of the sample are thereby produced, and are applied onto a specimen slide and then further processed in a staining device 475. One example of a staining device 475 of this kind is described in U.S. Pat. No. 6,821,072 (stainer), which is incorporated herein by reference in its entirety. In the stainer 475, the specimen slide passes through several baths having reagents. After completion of the staining process, the specimen slide is equipped with a coverslip in a further device such as cover slipper 480 (coverslipper). One example of a coverslipper 480 is likewise depicted and described in U.S. Pat. No. 6,821,072 (coverslipper), which is incorporated herein by reference in its entirety. In one embodiment, the two devices are connected to one another via a transfer station. In the coverslipper 480, a liquid adhesive is applied via a hollow needle onto the sample and the coverslip is placed thereonto. The adhesive must then dry in order to prevent the coverslip from shifting on the specimen slide. The stained and coverslipped samples on the specimen slides are then viewed with a microscope or a microscopic scanning device 485 for diagnosis. One example of a scanning device 485 is depicted and described in U.S. Pat. No. 7,133,543 B2 (scanner), which is incorporated herein by reference in its entirety. During the process, multiple specimen slides are grouped together, above or next to one another, in transportable racks. They then pass through the respective process in the various devices.

In the various devices, there are individual process steps which are time-critical and in which loss of or damage to the sample occurs if the processing time is too short or too long. Provision is also made for a variety of process steps in which the samples are processed under a pressure >1 bar and at a temperature >20° C. Desiccation of the samples in the processor 460 or the stainer 475, or drying of the adhesive applied onto the sample in the coverslipper 480, also result in damage to the sample.

In an automatic coverslipper 480 or a scanning device 485, the specimen slides arranged in the racks are automatically withdrawn individually and conveyed to a processing station. It is important here that the association between specimen slide and cassette compartment not be lost, and that the transport process be completed. The above-described possible damage to or loss of the samples, or undefined device states, occur in the event of a power supply failure.

The object of this embodiment is to avoid these disadvantages and to ensure reliable emergency operation of the device in the event of power fluctuations or a power failure. This object is achieved by way of the following features:

Each device is equipped with a dedicated (integrated) uninterruptible power supply (UPS).

A controller (e.g., a microcontroller, central processing unit, or other type of computer processor device) is provided which, upon a response by the UPS (power supply failure, power fluctuations), switches off those power consumers of the device which are not immediately required (e.g. displays, heating devices, pumps, transport devices, etc.) and/or does not start any new processes.

Via the controller, the samples in the (time-) critical processes are processed to completion (e.g. applied adhesive is covered with a coverslip, the hollow needle is introduced into a vessel with solvent, infiltration with paraffin).

Via the controller, the samples are conveyed into a non-critical area (samples in a staining bath are conveyed into a water bath, specimen slides are conveyed back into the rack).

Via the controller and the charge state of the UPS of each individual device, calculation and control are implemented as to whether the sample is to be processed to completion or conveyed into a non-critical area.

The UPSs of the individual devices are electrically connected to one another via an electrical connection 490.

The electrical connection is activated by the control device only upon a response by the UPSs.

The calculated data regarding remaining running time and charge state are exchanged among the individual control devices.

The control devices are electrically/electronically connected to one another via a bus system 495 or alternatively, a network 495.

In the event of a power supply failure, the UPSs of the other units are also utilized via the control device.

In the event of failure of only one or two phases of the power supply, continued operation can be ensured via the control device and the electrical connections.

After utilization of the UPS, normal operation is resumed via the control device only when a predetermined charge state of the UPS has again been reached.

Via the control device, firstly the interrupted (time-critical) processes are continued prior to normal operation.

A device having no interrupted time-critical processes (e.g. scanner, embedder=device for embedding the sample into a paraffin block) is put back into operation via the control device only after a predetermined or predeterminable charge state of the UPS, or of all UPSs, has been reached.

Each control device can take on the functionality of a master for coordination and for data exchange with all control devices.

The master control device can be selected manually or automatically in accordance with the capacity utilization of the control device.

The master control device can take over calculation of the remaining running time of all connected control devices, and exchanges data with the individual control devices.

The networking of all UPSs ensures that all critical processes are safely terminated, and that a longer remaining running time is furnished for individual devices in order to terminate processes normally.

Threshold values for battery discharge can be selected via the control device for each individual UPS, so that devices with time-critical processes (processors, strainers) can resume operation more quickly than devices with less-critical or completed processes (scanners, embedders, etc.).

The sequence in which the individual devices are restarted can be preselected via the master (control device).

Battery charge threshold values that must be reached before the device resumes operation can be preselected for each individual UPS via the control device.

An emergency power unit can be integrated into the assemblage of individual UPSs.

EXAMPLE EMBODIMENTS

In one embodiment, a digital pathology device 10 includes a stage upon which a glass slide is positioned during scanning and a slide rack in which glass slides are positioned before and after scanning and a slide conveyor system configured to move glass slides between a position in the slide rack and a position on the stage and a power switch configured to control the flow of electrical power between an external power source and the digital pathology device 10. The scanning device 10 also includes a processor configured to detect a signal from the power switch indicating that the flow of electrical power from the external power source to the digital pathology device 10 is to be switched off. When the processor detects the signal from the power switch indicating that the flow of electrical power from the external power source to the digital pathology device 10 is to be switched off, the processor is configured to control the stage and the slide rack and the slide conveyor system to position all glass slides in the slide rack prior to termination of the flow of electrical power from the external power source to the digital pathology device 10.

In one embodiment, the power switch further comprises an off-delay control relay configured to delay termination of the flow of electrical power from the external power source to the digital pathology device 10.

In one embodiment, a digital pathology device 10 includes a stage upon which a glass slide is positioned during scanning and a slide rack in which glass slides are positioned before and after scanning and a slide conveyor system configured to move glass slides between a position in the slide rack and a position on the stage and an uninterruptible power supply configured to supply power to the digital scanning device 10 in the event of a power failure comprising a termination of the flow of electrical power from an external power source to the digital pathology device 10. The scanning device 10 also includes a processor configured to detect a signal from the uninterruptible power supply indicating that the flow of electrical power from the external power source to the digital pathology device 10 has been terminated. When the processor detects the signal from the uninterruptible power supply indicating that the flow of electrical power from the external power source to the digital pathology device 10 has been terminated, the processor is further configured to control the stage and the slide rack and the slide conveyor system to position all glass slides in the slide rack prior to termination of the flow of electrical power from the uninterruptible power supply to the digital pathology device 10.

In one embodiment, the processor is further configured to delay control of the stage and the slide rack and the slide conveyor system to position all glass slides in the slide rack until the uninterruptible power supply has reached a predetermined threshold power level.

In one embodiment, a digital pathology device 10 comprises a plurality of moving parts including a stage upon which a glass slide is positioned during scanning and a slide rack in which glass slides are positioned before and after scanning and a slide conveyor system configured to move glass slides between a position in the slide rack and a position on the stage. The digital pathology device 10 also includes a housing having an open position and a closed position. In one embodiment, the housing may be configured to surround the plurality of moving parts on at least a plurality of sides in the closed position. The digital pathology device 10 also includes a sensor system configured to detect a transition of the housing from the closed position to the open position.

The digital pathology device 10 also includes a processor configured to control movement of the plurality of moving parts. The processor is configured to receive a signal from the sensor system and determine based upon the signal that the housing has transitioned from the closed position to the open position. Subsequent to determining that the housing has transitioned from the closed position to the open position, the processor is further configured to control the stage and the slide rack and the slide conveyor system to position all glass slides in the slide rack. Subsequent to positioning all glass slides in the slide rack, the processor is further configured to prevent movement of the plurality of moving parts. In one embodiment, the sensor system is a magnetic sensor system.

In one embodiment, a digital pathology device 10 having a stage upon which a glass slide is positioned during scanning and a slide rack in which glass slides are positioned before and after scanning and a slide conveyor system configured to move glass slides between a position in the slide rack and a position on the stage implements a method for delaying a power-off condition. Performing the method includes detecting a signal from a power switch configured to control the flow of electrical power between an external power source and determining based on the signal from the power switch that the flow of electrical power from an external power source to a digital pathology device 10 is to be terminated. The method also includes delaying termination of the flow of electrical power from the external power source to a digital pathology device 10 for a predetermined delay period and during the delay period, controlling the stage and the slide rack and the slide conveyor system to position all glass slides in the slide rack prior to termination of the flow of electrical power from the external power source to the digital pathology device 10. In one embodiment, the method also includes using an off-delay control relay to delay termination of the flow of electrical power from the external power source to the digital pathology device 10.

In one embodiment, a digital pathology device 10 having a stage upon which a glass slide is positioned during scanning, a slide rack in which glass slides are positioned before and after scanning, a slide conveyor system configured to move glass slides between a position in the slide rack and a position on the stage, and an uninterruptible power supply configured to supply power to the digital scanning device 10 in the event of a power failure comprising a termination of the flow of electrical power from an external power source to the digital pathology device 10 implements a method for delaying a power-off condition. Performing the method includes detecting a signal from the uninterruptible power supply, determining based on the signal from the uninterruptible power supply that the flow of electrical power from the external power source to a digital pathology device 10 has been terminated, and subsequent to determining that during the flow of electrical power from the external power source to a digital pathology device 10 has been terminated, controlling the stage and the slide rack and the slide conveyor system to position all glass slides in the slide rack prior to termination of the flow of electrical power from the uninterruptible power supply to the digital pathology device 10.

In one version of embodiment, the method also includes delaying control of the stage and the slide rack to position all glass slides in the slide rack until the uninterruptible power supply has reached a predetermined threshold power level.

In one embodiment, a digital pathology device 10 having a plurality of moving parts including a stage upon which a glass slide is positioned during scanning, a slide rack conveyor system configured to move a slide rack in which glass slides are positioned before and after scanning, a slide conveyor system configured to move glass slides between a position in the slide rack and a position on the stage, and a housing having an open position and a closed implements a method for delaying a power-off condition. Performing the method includes receiving a signal from a sensor system, determining based upon the signal that the housing has transitioned from the closed position to the open position and subsequent to determining that the housing has transitioned from the closed position to the open position, controlling the stage and the slide rack and the slide conveyor system to position all glass slides in the slide rack, and subsequent to positioning all glass slides in the slide rack, controlling the plurality of moving parts to prevent movement of the plurality of moving parts. In one embodiment, the sensor system is a magnetic sensor system.

In one embodiment, a pathology sample processing device includes a pathology sample processing system configured to process a pathology sample. The device also includes a conveyor system configured to move a pathology sample from a first position to a second position and a power switch configured to control the flow of electrical power between an external power source and the pathology sample processing device. The device also includes a processor configured to detect a signal from the power switch indicating that the flow of electrical power from the external power source to the pathology sample processing device is to be switched off. The processor is further configured to, in response to detecting the signal from the power switch indicating that the flow of electrical power from the external power source to the pathology sample processing device is to be switched off, control the pathology sample processing system and the conveyor system to position all pathology samples in a known position prior to termination of the flow of electrical power from the external power source to the pathology sample processing device.

In a version of this embodiment, the power switch further comprises an off-delay control relay configured to delay termination of the flow of electrical power from the external power source to the pathology sample processing device. In a version of this embodiment, at least a portion of the pathology sample is positioned on a glass slide.

In one embodiment, a pathology sample processing device includes a pathology sample processing system configured to process a pathology sample and a conveyor system configured to move a pathology sample from a first position to a second position. The device also includes an uninterruptible power supply configured to supply power to the pathology sample processing device in the event of a power failure comprising a termination of the flow of electrical power from an external power source to the pathology sample processing device. The device also includes a processor configured to detect a signal from the uninterruptible power supply indicating that the flow of electrical power from the external power source to the pathology sample processing device has been terminated. The processor is also configured to, in response to detecting the signal from the uninterruptible power supply indicating that the flow of electrical power from the external power source to the pathology sample processing device has been terminated, control the pathology sample processing system and the conveyor system to position all pathology samples in a known position prior to termination of the flow of electrical power from the uninterruptible power supply to the pathology sample processing device.

In a version of this embodiment, the processor is further configured to delay control of the pathology sample processing system and the conveyor system to position all pathology samples in a known position until the uninterruptible power supply has reached a predetermined threshold power level. In a version of this embodiment, at least a portion of the pathology sample is positioned on a glass slide.

In one embodiment, a pathology sample processing device includes a plurality of moving parts including a pathology sample processing system configured to process a pathology sample and a conveyor system configured to move a pathology sample from a first position to a second position. The device also includes a housing having an open position and a closed position, the housing configured to surround the plurality of moving parts on at least a plurality of sides in the closed position and a sensor system configured to detect a transition of the housing from the closed position to the open position. The device also includes a processor configured to control movement of the plurality of moving parts. The processor is also configured to receive a signal from the sensor system and determine based upon the signal that the housing has transitioned from the closed position to the open position, and subsequent to determining that the housing has transitioned from the closed position to the open position, the processor is further configured to control the pathology sample processing system and the conveyor system to position all pathology samples in a known position and subsequently prevent movement of the plurality of moving parts during a time period in which the housing is in the open position. In one version of this embodiment, the sensor system is a magnetic sensor system.

In one embodiment, there is a method for delaying a power-off condition in a pathology sample processing device that has a pathology sample processing system configured to process a pathology sample and a conveyor system configured to move the pathology sample from a first position to a second position. In this embodiment, the method includes detecting a signal from a power switch configured to control the flow of electrical power between an external power source and the pathology sample processing device. The method also includes determining based on the signal from the power switch that the flow of electrical power from an external power source to the pathology sample processing device is to be terminated. The method also includes delaying termination of the flow of electrical power from the external power source to the pathology sample processing device for a predetermined delay period. During the delay period, the method also includes controlling the pathology sample processing system and the conveyor system to position all pathology samples in a known position prior to termination of the flow of electrical power from the external power source to the pathology sample processing device.

In this embodiment, the method also includes using an off-delay control relay to delay termination of the flow of electrical power from the external power source to the pathology sample processing device. In one version of this embodiment, at least a portion of the pathology sample is positioned on a glass slide.

In one embodiment, there is a method for delaying a power-off condition in a pathology sample processing device having a pathology sample processing system configured to process a pathology sample, a conveyor system configured to move the pathology sample from a first position to a second position, and an uninterruptible power supply configured to supply power to the pathology sample processing device in the event of a power failure comprising a termination of the flow of electrical power from an external power source to the pathology sample processing device. In this embodiment, the method includes detecting a signal from the uninterruptible power supply, determining based on the signal from the uninterruptible power supply that the flow of electrical power from the external power source to a pathology sample processing device has been terminated, and subsequent to determining that the flow of electrical power from the external power source to the pathology sample processing device has been terminated, controlling the pathology sample processing system and the conveyor system to position all pathology samples in a known position prior to termination of the flow of electrical power from the uninterruptible power supply to the pathology sample processing device.

In this embodiment, the method also includes delaying control of the pathology sample processing system and the conveyor system until the uninterruptible power supply has reached a predetermined threshold power level. In one version of this embodiment, at least a portion of the pathology sample is positioned on a glass slide.

In one embodiment, there is a method for delaying a power-off condition in a pathology sample processing device having a plurality of moving parts including a pathology sample processing system configured to process a pathology sample, a conveyor system configured to move the pathology sample from a first position to a second position, and a housing having an open position and a closed position. In this embodiment, the method includes receiving a signal from a sensor system and determining based upon the signal that the housing has transitioned from the closed position to the open position. The method also includes, subsequent to determining that the housing has transitioned from the closed position to the open position, controlling the pathology sample processing system and the conveyor system to position all pathology samples into a known position. The method also includes, subsequent to positioning all pathology samples into a known position, controlling the plurality of moving parts to prevent movement of the plurality of moving parts during a time period in which the housing is in the open position.

In one version of this embodiment, the sensor system is a magnetic sensor system. In one version of this embodiment, at least a portion of the pathology sample is positioned on a glass slide.

Figure 6A:
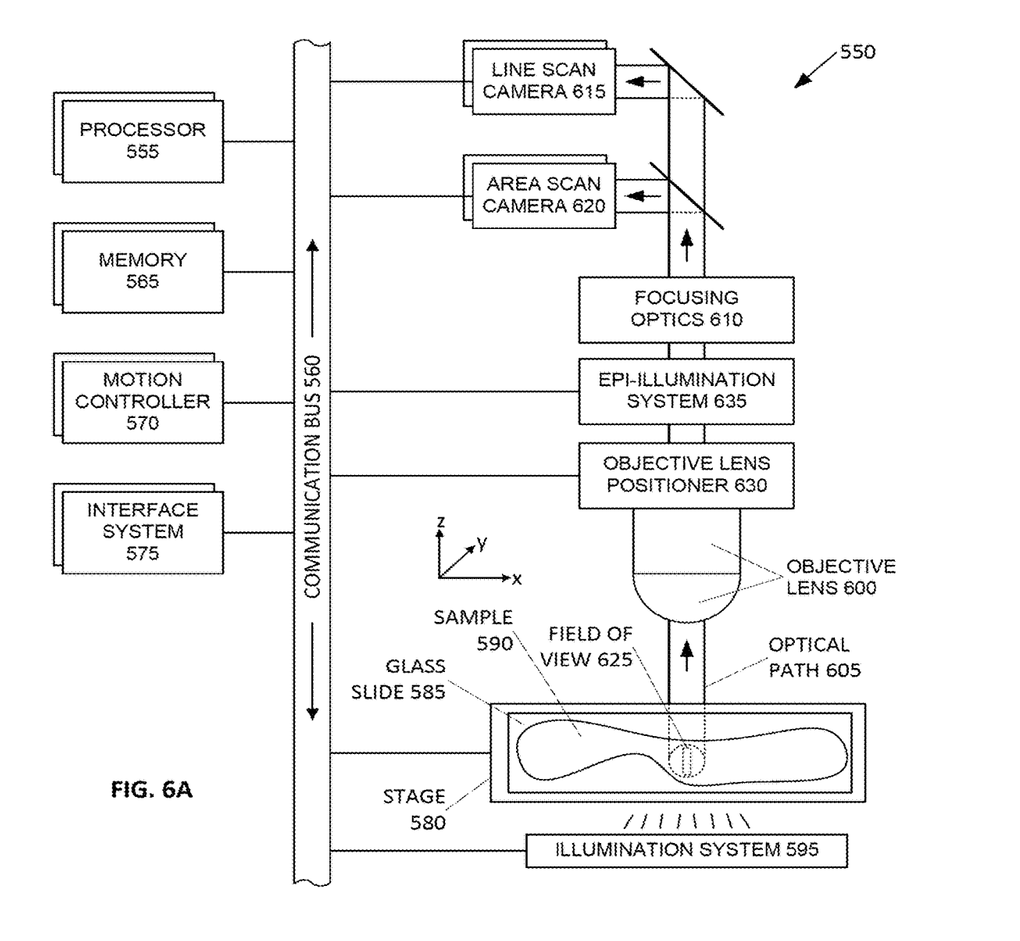
FIG. 6A is a block diagram illustrating an example processor enabled device that may be used in connection with various embodiments described herein.

FIG. 6A is a block diagram illustrating an example processor enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system or a scanning system) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description that follows, these elements will be described in the singular except when needed to be described in the plural to convey the appropriate information.

The one or more processors 555 may include, for example, a central processing unit ("CPU") and a separate graphics processing unit ("GPU") capable of processing instructions in parallel or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555. The one or more processors may be configured to control the motor that drives the push/pull assembly and further configured to control movement of the scanning stage and the slide rack and thereby control the overall workflow of the digital imaging device and the loading of glass slides from the slide rack onto the stage and the unloading of glass slides from the stage into the slide rack.

The memory 565 provides storage of data and instructions for programs that can be executed by the processor 555. The memory 565 may include one or more volatile and persistent computer-readable storage mediums that store the data and instructions, for example, a random access memory, a read only memory, a hard disk drive, removable storage drive, and the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate XYZ movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium) or external devices such as an image server system, an operator station, a user station, and an administrative server system that are connected to the scanner system 550 via a network (not shown).

The illumination system 595 is configured to illuminate a portion of the sample 590. The illumination system may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In one embodiment, the illumination system 595 illuminates the sample 590 in transmission mode such that the line scan camera 615 and/or area scan camera 620 sense optical energy that is transmitted through the sample 590. Alternatively, or in combination, the illumination system 595 may also be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In one embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10 bit 64 linear array TDI line scan camera. It should be noted that a variety of bit depths for the line scan camera 615 can be employed for use with a fluorescence scanner embodiment of the scanning system 550.

The movable stage 580 is configured for precise XY movement under control of the processor 555 or the motion controller 570. The movable stage may also be configured for movement in Z under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. In one embodiment, the scanner system 550 may employ a high precision and tightly coordinated XY grid to aid in the location of the sample 590 on the movable stage 580. In one embodiment, the movable stage 580 is a linear motor based XY stage with high precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate, for example a 96-well plate. Other examples of the sample 590 include integrated circuit boards, electrophoresis records, petri dishes, film, semiconductor materials, forensic materials, or machined parts.

Objective lens 600 is mounted on the objective positioner 630 which, in one embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in XYZ axes are coordinated and controlled in a closed loop manner using motion controller 570 under the control of the processor 555 that employs memory 565 for storing information and instructions, including the computer-executable programmed steps for overall scanning system 550 operation.

In one embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75 NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, etc. The objective lens 600 combined with focusing optics 610 provides the total magnification for the scanning system 550. In one embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays, for example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615 so that the stage 580 can be in motion with respect to the line scan camera 615 during the digital image capture of the sample 590.

The image data generated by the line scan camera 615 is stored a portion of the memory 565 and processed by the processor 555 to generate a contiguous digital image of at least a portion of the sample 590. The contiguous digital image can be further processed by the processor 555 and the revised contiguous digital image can also be stored in the memory 565.

In an embodiment with two or more line scan cameras 615, at least one of the line scan cameras 615 can be configured to function as a focusing sensor that operates in combination with at least one of the line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In such an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in one embodiment the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data, e.g., an adjacent stripe. Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image strip. A plurality of adjacent image strips are similarly combined together to form a contiguous digital image of a portion or the entire sample 590. The scanning of the sample 590 may include acquiring vertical image strips or horizontal image strips. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image strips be acquired in an adjacent or contiguous manner. Furthermore, the resulting image of the sample 590 may be an image of the entire sample 590 or only a portion of the sample 590.

In one embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly, for example via a network (not shown).

Figure 6B:
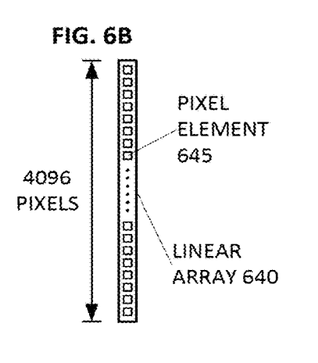
FIG. 6B is a block diagram illustrating an example line scan camera having a single linear array.

FIG. 6B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view varies in accordance with the magnification of the scanner system 550.

Figures 6C, 6D:
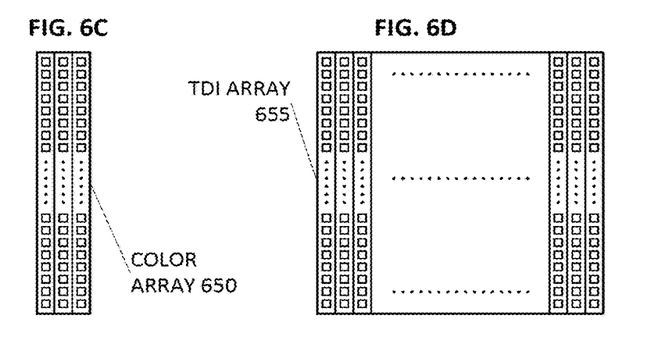
FIG. 6C is a block diagram illustrating an example line scan camera having three linear arrays.
FIG. 6D is a block diagram illustrating an example line scan camera having a plurality of linear arrays.

FIG. 6C illustrates a line scan camera having three linear arrays, each of which may be implemented as a CCD array. The three linear arrays combine to form a color array 650. In one embodiment, each individual linear array in the color array 650 detects a different color intensity, for example red, green, or blue. The color image data from each individual linear array in the color array 650 is combined to form a single field of view 625 of color image data.

FIG. 6D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays, for example common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A digital pathology device configured to process a slide rack in which glass slides are positioned before and after scanning, the digital pathology device comprising:
    a plurality of moving parts including a stage upon which a glass slide is positioned during scanning and a slide conveyor system configured to move glass slides between a position in the slide rack and a position on the stage;
    a housing having an open position and a closed position, the housing configured to surround the plurality of moving parts on at least a plurality of sides in the closed position;
    a sensor system configured to detect a transition of the housing from the closed position to the open position;
    a hardware processor programmed to control movement of the plurality of moving parts, wherein the hardware processor is programmed to receive a signal from the sensor system and determine based upon the signal that the housing has transitioned from the closed position to the open position during processing of the slide rack, and in response to determining that the housing has transitioned from the closed position to the open position, the hardware processor is further programmed to control the stage and the slide rack and the slide conveyor system to position all glass slides in the slide rack and subsequent to positioning all glass slides in the slide rack, to prevent movement of the plurality of moving parts.

2. The digital pathology device of claim 1, wherein the sensor system is a magnetic sensor system.

3. A method for delaying a power-off condition in a digital pathology device configured to process a slide rack in which glass slides are positioned before and after scanning, the digital pathology device having a plurality of moving parts including a stage upon which a glass slide is positioned during scanning, a slide rack conveyor system configured to move a slide rack, a slide conveyor system configured to move glass slides between a position in the slide rack and a position on the stage, and a housing having an open position and a closed position, the method comprising:
    receiving a signal from a sensor system;
    determining based upon the signal that the housing has transitioned from the closed position to the open position during movement of at least one part the plurality of moving parts;
    in response to determining that the housing has transitioned from the closed position to the open position, controlling the stage and the slide rack and the slide conveyor system to position all glass slides in the slide rack, and subsequent to positioning all glass slides in the slide rack, controlling the plurality of moving parts to prevent movement of the plurality of moving parts.

4. The method of claim 3, wherein the sensory system is a magnetic sensor system.

5. A pathology sample processing device comprising:
a plurality of moving parts including a pathology sample processing system configured to process a pathology sample and a conveyor system configured to move a pathology sample from a first position to a second position;
a housing having an open position and a closed position, the housing configured to surround the plurality of moving parts on at least a plurality of sides in the closed position;
a sensor system configured to detect a transition of the housing from the closed position to the open position;
a hardware processor programmed to control movement of the plurality of moving parts, wherein the hardware processor is programmed to receive a signal from the sensor system and determine based upon the signal that the housing has transitioned from the closed position to the open position while the pathology sample processing system is processing the pathology sample, and in response to determining that the housing has transitioned from the closed position to the open position, the hardware processor is further programmed to control the pathology sample processing system and the conveyor system to position all pathology samples from the first position to the second position such that the pathology samples are retained in a known position and subsequently prevent movement of the plurality of moving parts during a time period in which the housing is in the open position.

6. The pathology sample processing device of claim 5, wherein the sensor system is a magnetic sensor system.

7. The device of claim 5, wherein the known position corresponds to a predetermined position of the pathology samples relative to the conveyor system.

8. The device of claim 5, wherein a storage receptacle is disposed at the second position, wherein the storage receptacle is controlled by the hardware processor.

9. A method for delaying a power-off condition in a pathology sample processing device having a plurality of moving parts including a pathology sample processing system configured to process a pathology sample, a conveyor system configured to move the pathology sample from a first position to a second position, and a housing having an open position and a closed position, the method comprising:
receiving a signal from a sensor system;
determining based upon the signal that the housing has transitioned from the closed position to the open position during processing or conveying of the pathology sample;
in response to determining that the housing has transitioned from the closed position to the open position, controlling the pathology sample processing system and the conveyor system to position all pathology samples from the first position to the second position such that the pathology samples are conveyed into a known position such that the device may resume normal operations upon resumption of operations, and
subsequent to positioning all pathology samples into a known position, controlling the plurality of moving parts to prevent movement of the plurality of moving parts during a time period in which the housing is in the open position.

10. The method of claim 9, wherein the sensor system is a magnetic sensor system.

11. The method of claim 9, wherein at least a portion of the pathology sample is positioned on a glass slide.

12. The method of claim 9, wherein the known position corresponds to a predetermined position of the pathology samples relative to the conveyor system.

13. The method of claim 9, wherein a storage receptacle is disposed at the second position, wherein the pathology samples are deposited into the storage receptacle when moved to the second position by the conveyor system.

* * * * *